United States Patent

Syväniemi

[11] Patent Number: 5,918,049
[45] Date of Patent: Jun. 29, 1999

[54] METHOD FOR MANAGING RESOURCES ALLOCATED IN A COMPUTER

[75] Inventor: Martti Syväniemi, Masala, Finland

[73] Assignee: Nokia Telecommunications Oy, Espoo, Finland

[21] Appl. No.: 08/855,703

[22] PCT Filed: Jul. 28, 1993

[86] PCT No.: PCT/FI93/00304

§ 371 Date: Apr. 3, 1995

§ 102(e) Date: Apr. 3, 1995

[87] PCT Pub. No.: WO94/03855

PCT Pub. Date: Feb. 17, 1994

Related U.S. Application Data

[63] Continuation of application No. 08/379,539, filed as application No. PCT/FI93/00304, Jul. 28, 1993, abandoned.

[30] Foreign Application Priority Data

Jul. 29, 1992 [FI] Finland ..................................... 923430

[51] Int. Cl.⁶ .................................................... G06F 12/06
[52] U.S. Cl. ............................................................ 395/674
[58] Field of Search ..................... 395/670, 676, 395/677, 671, 672, 673, 674

[56] References Cited

U.S. PATENT DOCUMENTS

| | | | |
|---|---|---|---|
| 4,435,766 | 3/1984 | Haber et al. | 395/726 |
| 4,493,020 | 1/1985 | Kim et al. | 364/200 |
| 4,635,187 | 1/1987 | Baron et al. | 364/200 |
| 4,658,351 | 4/1987 | Teng | 364/200 |
| 4,847,751 | 7/1989 | Nakade et al. | 364/200 |
| 4,918,595 | 4/1990 | Kahn et al. | 395/672 |
| 5,168,566 | 12/1992 | Kuki et al. | 395/650 |
| 5,210,872 | 5/1993 | Ferguson et al. | 395/650 |

FOREIGN PATENT DOCUMENTS

| | | | |
|---|---|---|---|
| 0094841 | 3/1984 | European Pat. Off. | G06F 9/46 |
| 0450917 | 10/1991 | European Pat. Off. | G06F 12/08 |

*Primary Examiner*—James P. Trammell
*Assistant Examiner*—John Q. Chavis
*Attorney, Agent, or Firm*—Pillsbury Madison & Sutro LLP

[57] ABSTRACT

A method for managing resources allocated in a computer, wherein the allocated resources are maintained or released by time monitoring. In the method, a task controller is allocated for the management of resources required for a task to be executed. The controller allocates resources required to execute the task. The controller starts time monitoring in each resource. If required by the task, the controller renews the resource allocations before the expiry of the respective time monitoring periods, and the controller releases all resources allocated for the task after the completion of the task.

15 Claims, 2 Drawing Sheets

METHOD FOR MANAGING RESOURCES ALLOCATED IN A COMPUTER

This application claims priority of PCT/FI93/00304 filed on Jul. 28, 1993 which claims priority of foreign document F923430 filed Jul. 29, 1992.

This is a continuation of application Ser. No. 08/379,539, filed on Apr. 3, 1995.

BACKGROUND OF THE INVENTION

This invention relates to a method for managing resources allocated in a computer, wherein the allocated resources are maintained or released by time monitoring.

The execution of a specific task in a computer system often requires co-operation between several resources based on recurrent use of the hardware, software and/or memory resources. The use of resources thus refers to the allocation of the parts of the computer system for the execution of a specific task, no matter whether these parts belong to the hardware, computation or memory capacity of the computer.

The resource allocation system has been problematic in that the known computers do not comprise any particularly advanced systems for monitoring allocated resources. Especially after the completion of the task assigned to the computer, the release of all or some of the resources may fail for some reason, e.g. due to malfunction, a programming error, etc. In practice, this problem easily results in that the system runs short of certain kind of resources in the long run, or that there are needlessly allocated resources in the system for long periods of time. This in turn reduces the capacity and may finally cause the operation to cease if all resources of a certain type have been allocated for one or more tasks which have been completed a long time ago.

One solution to the problem is offered by fixed-time monitoring which can be used in cases where it is possible to determine a maximum duration for the task to be executed by the resource. The resource is allocated for the maximum period of time, after which the resource releases itself if it has not yet been released. Periodic monitoring has been used for resources allocated for an indefinite period of time or for resources allocated for a very long period of time. It is thereby checked intermittently that all resources in the system have changed tasks. If this has not happened, it is checked whether the main task is still uncompleted throughout the system, on the basis of which the resources are then released or maintained unchanged. One application of this procedure is the virtual memory management, in which the central memory is divided into pages (resources), and the use of different memory pages is monitored during the execution of a program. Unused pages are replaced with new pages from a mass memory whenever required. A disadvantage of periodic monitoring is that it loads the system and is complicated, as the monitoring procedure that checks all allocated resources has to be started intermittently, and if the system has to operate in parallel with the checking routine, a very complicated management algorithm will result as new resources are allocated all the time while old ones are released. In addition, a priority conflict occurs in the fixed-time monitoring of long tasks between the monitoring frequency and the execution if the average required allocation time is only a fraction of the time required for the entire task so that there occur needlessly allocated resources within the time monitoring. For instance, the memory pages to be replaced in the virtual memory management are not released until required, i.e. the central memory may, in principle, be filled up, which reduces the capacity of the system e.g. during the execution of background routines which do not use the virtual memory.

SUMMARY OF THE INVENTION

The object of the present invention is to solve the resource management problems by eliminating resource allocations in cases where the resource remains needlessly allocated for an indefinite period of time. To achieve this, the method according to the invention is characterized by allocating a task controller for the management of resources required for a task to be executed;

allocating by the task controller resources required to execute the task;

starting time monitoring in each resource by the controller;

renewing the resource allocations by the controller before the expiry of the respective time monitoring periods, if required by the task; and releasing by the controller all resources allocated for the task after the completion of the task.

The task controller according to the invention thus operates so that when it allocates a resource for the execution of a specific task, it also requests the resource to start the time monitoring itself for a period of time which is either equal to the maximum allocation time when this suits the nature of the task, or with a resource to be allocated for an indefinite period of time, the allocation time depends on the distribution of use so that e.g. 90% of all cases (on a statistical basis) are processed within the allocation time. The method according to the invention is suitable for the management of both hardware resources (HW) and software resources (SW, e.g. memory buffers). The method is very reliable in operation as its operability is based on time monitoring, and all error situations can be handled simply by a restart. The method according to the invention is also operative in an environment in which communication between different resources is unreliable. The method supports well the modern modular and object-oriented programming methods.

BRIEF DESCRIPTION OF THE DRAWINGS

In the following the invention will be described by means of examples with reference to the attached drawings, in which.

DETAILED DESCRIPTION

Figure 1A:
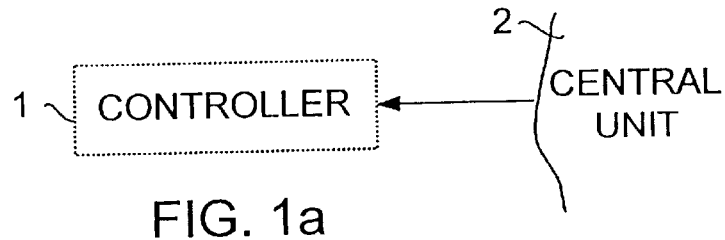
FIGS. 1a to 1c illustrate the resource management sequence of the method according to the invention in a normal case.

In FIG. 1a, a computer system, such as a central unit 2, i.e. the external environment from the viewpoint of a task to be executed, allocates a controller 1 for the task. The controller may be a hardware or memory area resource capable of controlling other resources in a co-ordinated manner. The controller may be scheduled to release itself spontaneously after the expiry of a fixed time if the external environment 2 does not separately renew it, or it may be releasable by the external environment 2 only.

Figure 1B:
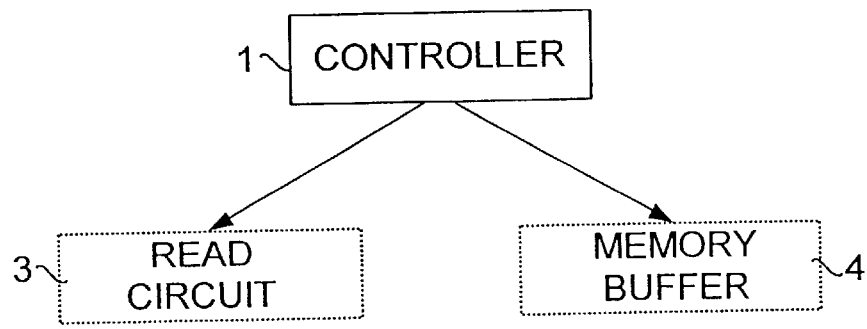

In FIG. 1b, the controller 1 allocates required resources from the computer system; in this specific case, it allocates a read circuit 3 and a memory buffer 4 of a keyboard (not shown) as hardware resources. The task assigned to the controller is thus to read characters from the keyboard to the memory buffer. Moreover, the controller starts a separate time monitoring in the keyboard read circuit and memory buffer 4. The time monitoring period may vary from one resource to another, being e.g. 60 seconds in the read circuit 3 and 120 seconds in the memory buffer 4. As mentioned above, the resources can be allocated on the basis of the maximum time reserved for the task or on the basis of the probable task duration.

After this the time monitoring of the resources does not strain the controller or any other part of the computer system but each resource monitors itself in this respect. Time monitoring can be realized e.g. by a simple time counter program which is attached to the program controlling the operation of each resource or is activated in the program or hardware resource.

Figure 1C:
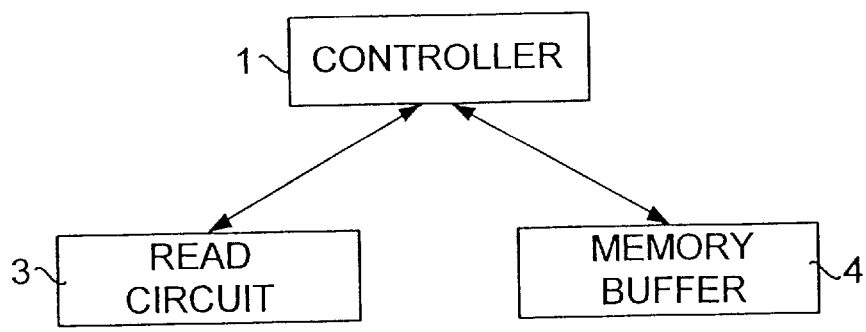

In FIG. 1c, the system executes a given task by using the allocated resources, and after the task is completed, all resources are released immediately. Communication with the resources takes place via the controller 1. If the controller has been allocated for a fixed period of time, its possible renewal has to take place here, prior to the release of the controller's own time monitoring.

Figure 2:
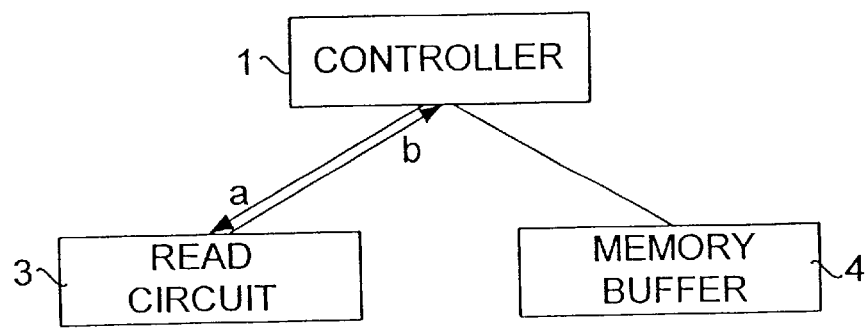
FIG. 2 illustrates the renewal of a resource allocation.

FIG. 2 shows a case in which the renewal of a resource is required to complete the task. If the resources allocated in FIG. 1b have been allocated for 50 seconds, and the task has not yet been completed, the controller 1 renews the allocation of the read circuit 3 by a renewal request a for another 60 seconds. The buffer 3 thereby acknowledges (arrow b) the further allocation to the controller, or does not accept/ does not respond to the renewal request so that the controller can also release itself.

The hand-shaking according to the invention ensures that the resources remain needlessly allocated for no more than the duration of the time monitoring of the particular resource. The resource is released on the basis of the time monitoring only when it is not released by the controller after the completion of the task, i.e. when the resource might otherwise remain allocated for an indefinite period of time; the renewal of allocation is required only seldom, depending on the given use distribution parameters, e.g. in 10% of all cases. Accordingly, the resource management binds very little capacity in the method according to the invention.

The minimizing of the duration of the time monitoring and the minimizing of the number of renewal requests are mutually contradictory objectives depending on the reliability of the system and the available capacity, whereby the required compromise is determined by parametrization, i.e. fixed parameters specific to the central unit, or computed parameters optimized for each task, for instance.

Correspondingly, the allocation of the memory buffer 4 in FIG. 2 is renewable, if required, after 110 seconds from the start of the task. After the renewal of the allocation one returns to the situation shown in FIG. 1c to wait for the completion of the task.

Figure 3A:
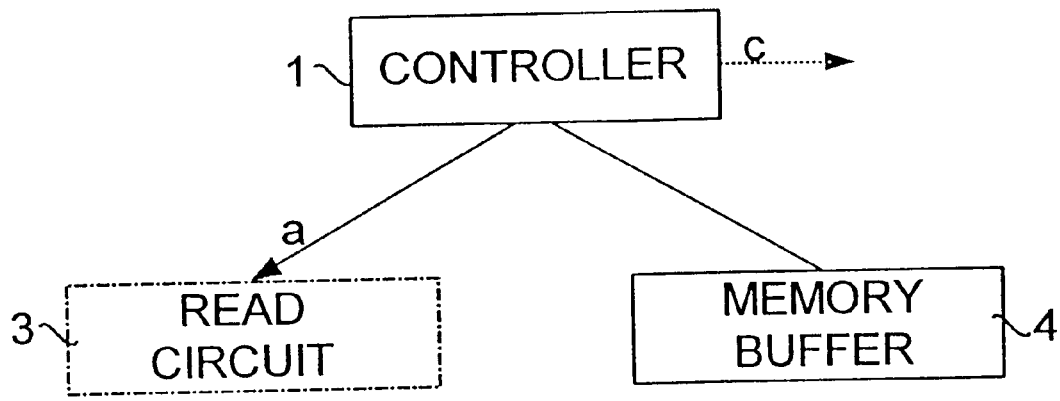
FIGS. 3a to 3c illustrate various resource allocation release situations.

FIG. 3a shows a situation in which a system part (in this specific case the read circuit 3) is damaged and/or incapable of communication. The following renewal request a of the allocation of the task controller 1 thereby fails (the acknowledgement b will not be received), and so the controller 1 releases itself, possibly after having sent an indication c of the failure of the task to its starter (the central unit).

Figure 3B:
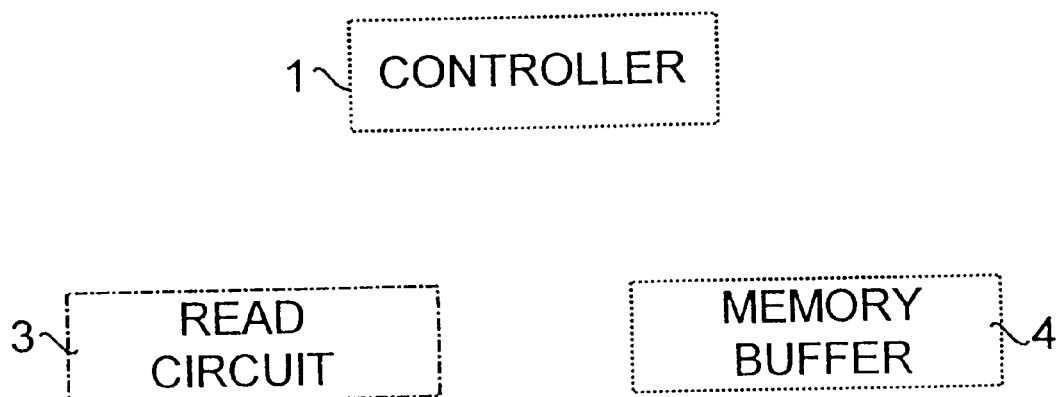

In the situation shown in FIG. 3b the fixed-time monitoring at the memory buffer 4 is released, and the memory area is freed. This situation typically results from the hardware failure described in connection with FIG. 3a or from the malfunction of the controller. Accordingly, all resources are released when the respective time monitorings are released even though the communication between the resources would be unreliable.

Figure 3C:
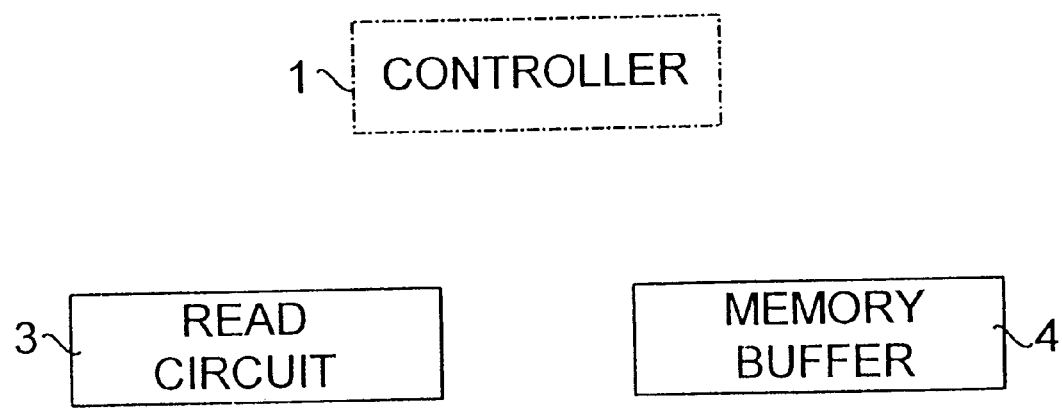

FIG. 3c shows a case in which the task controller fails or its allocation for a predetermined time is not renewed so that it is released. Thereafter all other allocated resources are released in accordance with their own time monitoring procedures if there are no renewal requests.

It is obvious to one skilled in the art that the different embodiments of the invention are not limited to the illustrating embodiments described above but they may vary within the scope of the attached claims.

I claim:

1. A method for managing resources allocated in a computer on which a plurality of tasks may be executed, comprising:

allocating, for a single specific task of the plurality of tasks, a task-specific controller for managing only the resources required for the single specific task; and, by the task-specific controller:
(a) allocating only the resources required to execute the single specific task;
(b) starting time monitoring in each allocated resource;
(c) renewing the resource allocations before expiration of the respective time monitoring periods, if required by the specific task; and
(d) releasing all resources allocated for the specific task after the completion of the specific task.

2. The method according to claim 1, wherein:
the task specific controller is a resource provided with time monitoring.

3. The method according to claim 1, wherein:
when the time monitoring period of each resource expires without a renewal, the resource is released spontaneously.

4. The method according to claim 1, wherein: the time monitoring period of each resource is determined on the basis of the maximal execution time of the specific task.

5. The method according to claim 1, wherein: the time monitoring period of each resource is determined on the basis of the probable execution time of the specific task.

6. A method for managing resources allocated in a computer on which a plurality of tasks may be executed, comprising:

allocating by a central unit of said computer, for a single specific task of the plurality of tasks, a task-specific controller for managing only the resources required for the single specific task, said task-specific controller being allocated either to be released by the central unit when the single specific task has been completed or to release itself after the expiry of a fixed time; and, by the task-specific task controller:
(a) allocating only the resources required to execute the single specific task;
(b) starting time monitoring in each resource;
(c) renewing the resource allocations before expiration of the respective time monitoring periods, if the specific task has not yet been completed; and
(d) releasing all resources allocated for the specific task immediately after the completion of the specific task.

7. The method according to claim 6, wherein:
the task-specific controller is a resource provided with time monitoring.

8. The method according to claim 6, wherein:
when the time monitoring period of each resource expires without a renewal, the resource is released spontaneously.

9. The method according to claim 6, wherein:

the time monitoring period of each resource is determined on the basis of the maximal execution time of the specific task.

10. The method according to claim 6, wherein:

the time monitoring period of each resource is determined on the basis of the probable execution time of the specific task.

11. A method for managing resources required for a task of a plurality of tasks, allocated in a computer, wherein the allocated resources are maintained or released by time monitoring, the maintaining or releasing being separate from task execution, the method comprising:

allocating by a processing unit a task-specific task controller for managing the resources required for the task to be executed; and, by the task-specific task controller:
        (a) allocating only the resources required to execute the task;
        (b) starting time monitoring in each resource;
        (c) renewing the resource allocations before expiration of the respective time monitoring periods; and
        (d) releasing all resources allocated for the task responsive to signaling indicating the completion of the task.

12. The method according to claim 11, wherein:

the task controller is a resource provided with time monitoring.

13. The method according to claim 11, wherein:

when the time monitoring period of each resource expires without a renewal, the resource is released spontaneously.

14. The method according to claim 11, wherein:

the time monitoring period of each resource is determined on the basis of the maximal execution time of the task.

15. The method according to claim 11, wherein:

the time monitoring period of each resource is determined on the basis of the probable execution time of the task.

\* \* \* \* \*